Aug. 12, 1958  O. LUDEMAN  2,847,180
VALVE MECHANISM

Filed June 28, 1956  2 Sheets-Sheet 1

INVENTOR
Oscar H. Ludeman
BY
James G. Bethell
ATTORNEY

Aug. 12, 1958     O. LUDEMAN     2,847,180
VALVE MECHANISM
Filed June 28, 1956     2 Sheets-Sheet 2
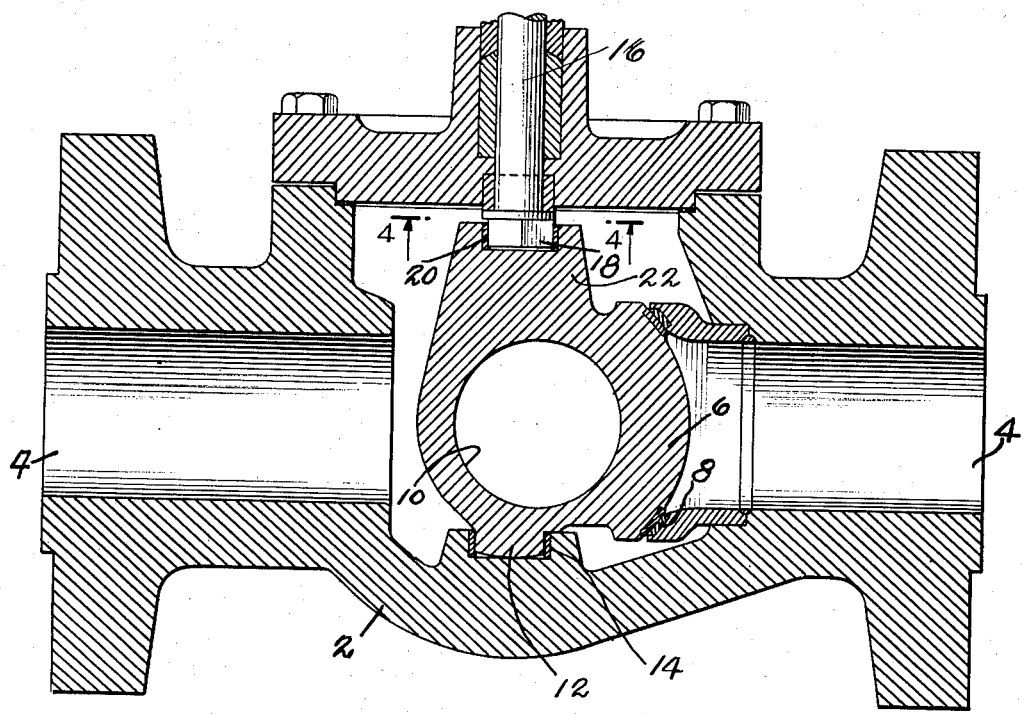
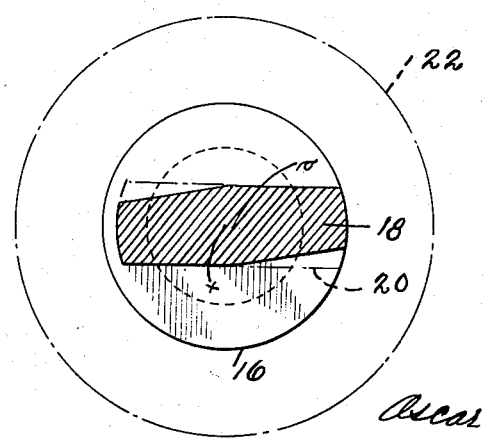
Oscar H. Ludeman
INVENTOR
BY James G. Beattie
ATTORNEY United States Patent Office 2,847,180
Patented Aug. 12, 1958

2,847,180

VALVE MECHANISM

Oscar Ludeman, New York, N. Y.

Application June 28, 1956, Serial No. 594,589

2 Claims. (Cl. 251—163)

My invention relates to valve mechanism employing a rotary valve, and provides a construction in which I obtain maximum tightness in seating and require but the minimum of effort in unseating.

Another object of my invention is to provide a valve construction in which "galling" of the valve seat on opening of the valve is eliminated in that the opening process begins with a direct lift or displacement of the valve from its seat, as distinguished from rotation of the valve, so that there is no tendency of the valve to drag across its seat.

More specifically, my invention provides a construction in which the axis of the valve stem is eccentric to a line extending perpendicularly to the center of a line extending straight across the valve seat. This off-center or eccentric feature produces a long, angular or wedging return approach to the seat when closing the valve, so that, after the valve is seated, slight additional turning effort will ensure the maximum degree of tightness of the valve.

In addition to this feature, the inner end of the valve stem is provided with an eccentric extension, viz., an extension which is eccentric to the valve stem axis. This extension is interlocked with a cavity or socket in the valve body and permits the valve stem to be turned a few degrees relatively to the valve without, however, imparting rotation to the valve. This extension is eccentric to the valve stem axis, and it will be apparent that in the valve-opening process the valve initially is lifted or displaced directly off its seat, thus requiring only the minimum effort in opening the valve, despite the fact that a high wedging action is imposed upon the valve in seating.

It is to be appreciated that the eccentric extension of the valve stem cooperates with the eccentric mounting of the valve stem, on both the opening and closing movements of the valve.

Without the slight lift or displacement of the valve producing by the eccentric extension of the valve stem, the long, angular, wedging return approach of the valve on closing adds appreciably in some cases to the effort required to open the valve. This effort may well exceed the power required to crack the valve from its seat, due to the entire steam load against the valve where steam flow is toward the back of the valve and against the seat. In medium and large size valves under high pressure service, this saving in opening effort due to the eccentric extension of the valve stem is a very considerable factor.

In the accompanying drawings,

Fig. 3 is a section taken substantially on the line 3—3 of Fig. 1; and

Fig. 4 is a view taken substantially on the line 4—4 of Fig. 3 and somewhat enlarged as compared with Fig. 3.

Figure 1:
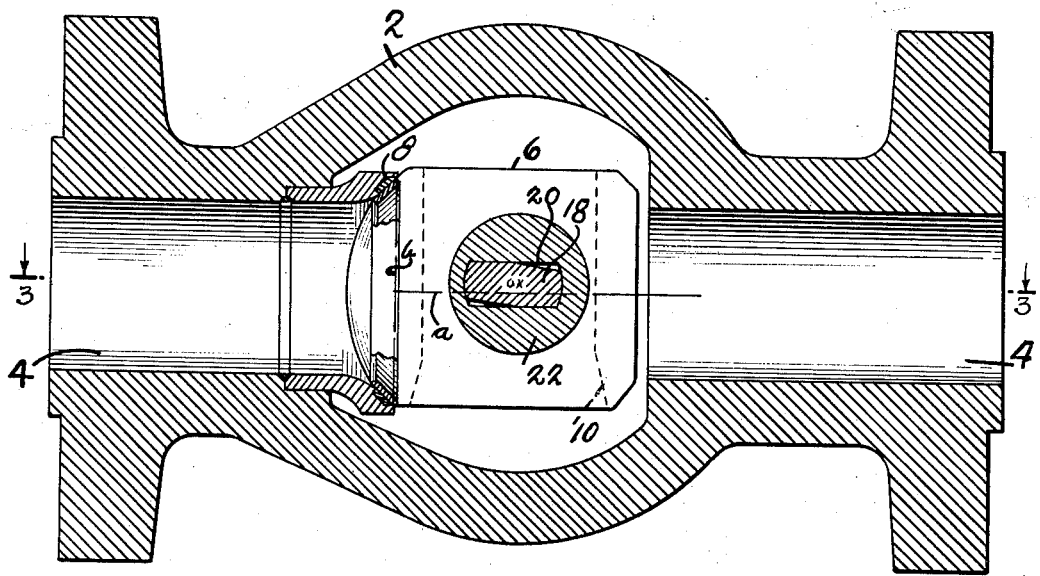
Fig. 1 is a cross-sectional view of my improved valve mechanism, showing the valve in closed position.

Referring to the drawings in detail, 2 designates the valve casing, which is provided with inlet and outlet ducts 4. The ducts 4 and casing 2 are axially aligned.

6 designates the valves or rotor. The valve seat, which is designated 8, is concentrically disposed about the inner end of one of the ducts 4.

Figure 2:
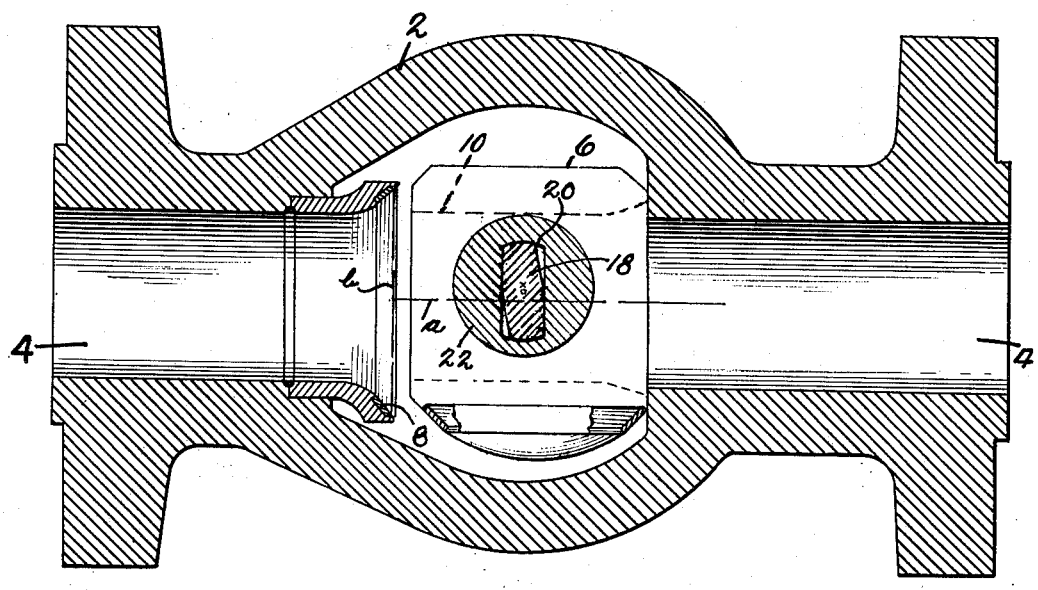
Fig. 2 is a view similar to Fig. 1 but showing the valve in open position.

The valve 6 is provided with a through-passageway 10, which, when the valve is in open position, is in alignment with the ducts 4, as illustrated in Fig. 2, so that an unobstructed path is provided for the flow of steam or other fluid being handled.

The lower end of the valve or rotor 6 is provided with a hub 12 (see Fig. 3), which rotates in bearing 14, provided for that purpose in the valve casing 2. The valve also has a slight rocking motion in this bearing, as will be brought out hereinafter.

16 designates the valve stem. This stem may be rotated manually or by motor. No driving means has been illustrated in that the same constitutes no part of my invention.

It will be seen from Figs. 1 and 2 in particular that the center line or axis x of the valve stem 16 is eccentric to a line a drawn perpendicularly to and through the center of a line b drawn across the valve seat parallel to the plane of the seat. This center line or axis x of the valve stem 16 is also eccentric to the axis of the valve passageway 10, so that at all times the center line or axis x of the valve stem is eccentric to the axes of the ducts 4, valve seat 8, valve casing 2, and valve passageway 10.

The valve stem 16 is provided at its inner end with an eccentric extension 18. The center of this extension has been designated o in Figs. 1 and 2. The eccentric extension of the valve stem extends into and is slightly rotatable with respect to a socket 20, which is provided in the end of hub 22, provided on the top of the valve or rotor 6.

It will be seen that the interlocking connection just described between the eccentric projection 18 of the valve stem 16 and the socket 20 in the hub 22 of the valve provides a construction whereby, on initial rotation of the valve stem 16 in a direction to open the valve 6, the valve will be displaced or lifted slightly away from its seat 8 to "crack" the valve. In this movement, however, the valve is not rotated, but on further rotation of the valve stem 16, the valve will be rotated and in an eccentric path, due to the eccentricity of the axis of the valve stem, as above described. In the construction illustrated, the rear face of the valve will abut the inside of the casing 2 when the valve is full open, at which time the valve passageway 10 will be aligned with the ducts 4, as illustrated in Fig. 2, to provide for the unobstructed flow of the steam or other fluid being handled.

In closing the valve, the initial rotation of the valve stem will restore the eccentric extension 18 of the valve stem to its original position in the socket 20 to displace the valve in the opposite direction to the direction in which it was displaced in opening, without, however, imparting rotation to the valve, and continued rotation of the valve stem in closing direction will rotate the valve in an eccentric path, so that a long, angular return approach of the valve to its seat results, which may be termed a long or narrow wedging approach. If an additional turning effort is imposed upon the valve stem after the valve is seated, the maximum degree of tightness of the valve is assured.

It will be understood that changes may be made in the details of construction and arrangement of parts above described within the purview of my invention.

What I claim is:

1. Valve mechanism comprising, in combination, a valve casing; an inlet duct and an outlet duct for the casing, said ducts and casing being coaxial; a rotatable valve within said casing provided with a passageway therethrough extending transversely of the axis of rotation of the valve; a valve seat for said valve concentrically disposed about the inner end of one of said ducts; a valve stem, rotatable in fixed bearings, for rotating said valve, the axis of rotation of said stem being eccentric to a line drawn perpendicularly to and through the center of a line drawn across the valve seat parallel to the plane of the seat; and an interlocking connection between the inner end of said valve stem and the valve for cracking the valve from its seat without rotation of the valve on initial rotation of the valve stem, further rotation of the stem imparting rotation to the valve about an axis eccentric to the axes of the said ducts, valve casing and valve seat, until said passageway is in alignment with said ducts; said interlocking connection providing for rotation of the valve stem without rotation of the valve on initial rotation of the stem in closing the valve, to displace the valve toward its seat, continued rotation of the valve stem effecting rotation of the valve about an axis eccentric to the axes of said ducts, to bring the valve to its seat with a wedging approach.

2. Valve mechanism comprising, in combination, a valve casing; an inlet duct and an outlet duct for the casing, said ducts and casing being coaxial; a rotatable valve within said casing provided with a passageway therethrough extending transversely of the axis of rotation of the valve; a valve seat for said valve concentrically disposed about the inner end of one of said ducts; a valve stem, rotatable in fixed bearings, for rotating said valve about an axis eccentric to the axes of said ducts and valve seat; and an extension at the inner end of the valve stem eccentric to the axis of the valve stem, said extension extending into and co-acting with said socket; the co-action between said extension and socket being such that on initial rotation of the stem in closing the valve the valve stem will rotate without rotating the valve to displace the valve toward its seat, continued rotation of the stem effecting rotation of the valve about an axis eccentric to the axes of the said ducts, to bring the valve to its seat with a wedging approach.

References Cited in the file of this patent

UNITED STATES PATENTS

| | | |
|---|---|---|
| 2,200,474 | Heggem | May 14, 1940 |
| 2,577,725 | Drake | Dec. 11, 1951 |
| 2,690,894 | Blevans | Oct. 5, 1954 |
| 2,765,142 | Ludeman | Oct. 2, 1956 |